Sept. 27, 1966   HANS-CHRISTOF KLEIN   3,274,768
PRIME-MOVER SYSTEM
Filed Nov. 26, 1963   2 Sheets-Sheet 1

HANS-CHRISTOF KLEIN
INVENTOR.

BY Mestern, Ross & Mestern

HANS-CHRISTOF KLEIN
INVENTOR.

BY Mestern, Ross & Mestern

— # United States Patent Office 3,274,768
Patented Sept. 27, 1966

3,274,768
PRIME-MOVER SYSTEM
Hans-Christof Klein, Hattersheim (Main), Germany, assignor to Alfred Teves Maschinen- und Armaturenfabrik Kommandit-Gesellschaft, Frankfurt am Main, Germany, a limited-liability company of Germany
Filed Nov. 26, 1963, Ser. No. 325,916
Claims priority, application Germany, Dec. 3, 1962, T 23,114
14 Claims. (Cl. 60—19)

The present invention relates to a prime-mover system incorporating a gas turbine and, more particularly, to improvements in such systems and a method of operating same.

It has been known heretofore to provide a prime-mover system wherein a gas turbine and a compressor or densifier are mounted upon a common output shaft driven by the turbine for compressing a combustion-sustaining gas prior to supplying it directly to the turbine or to a combustion chamber associated therewith wherein a fuel is admixed with the gas. The output shaft of the turbine which, in the case described, also constitutes the driven shaft of the compressor, must be connected to the load via a speed-reducing transmission as a consequence of the relatively high speeds of the turbine. Frequently, when a hydraulic transmission (e.g. a torque converter) is interposed between the load and the prime mover, a step-down gear arrangement must be provided between the torque converter and the gas-turbine shaft, since the velocity of the latter is generally too great to enable direct operation of a hydraulic transmission by the shaft.

Such constructions have, as a primary disadvantage, efficiency characteristics which are functions of turbine speed so that there exists an optimum speed for the turbine-and-compressor aggregate at which the efficiency is at its maximum. Fluctuations in the loading of the output shaft, however, frequently cause the speed thereof to fall below or increase above the optimum value and result in a decrease in the operating efficiency of the system.

It is the principal object of the present invention, therefore, to provide a prime-mover system incorporating a gas turbine wherein there is substantially no reduction in operating efficiency upon changes in the magnitude of the load or output-shaft velocity.

It is a further object of this invention to provide a prime-mover system and a method of operating same which permits the use of a hydraulic transmission of smaller capacity than that possible heretofore.

These and other objects of the present invention, which will become apparent hereinafter, are attained in accordance with the present invention by providing a prime-mover system which comprises a gas turbine having an output member or shaft and a compressor having a driven member or shaft rotatable independently of the output member but coupled therewith by a hydraulic pump; the output and driven members can thus be connected respectively to relatively displaceable pumping members of the pump, the latter forming a fluid coupling between the output member and the driven member. In a so-called "neutral" condition of the system, wherein the prime mover is decoupled from the load, the hydraulic pump constitutes a hydrostatic link between the output member of the turbine and the driven member of the compressor, which thus operate at substantially identical velocities, the pressure within the pump chamber between the relatively displaceable pumping members being proportional to the inertia of the driven member of shaft. Advantageously, the output shaft of the turbine and the driven shaft of the compressor are coaxial with one another and are mechanically connected with the pumping members, the latter being angularly displaceable about the common axis of these shafts.

According to another feature of this invention, the system comprises a hydraulic motor whose output member is connectable to a load and conduit means interconnecting the pump and the motor whereby the fluid displaced by the pump, upon relative movement of the pumping members, is communicated to the hydraulic motor for operating the load. The conduit means may then include a valve between the pump and the motor preventing the flow of fluid from the pump to the motor in the "neutral" operative condition of the control means. The latter may be actuated by the operator-controllable accelerator of the system for simultaneously feeding fuel to the gas turbine and providing a fluid connection between the pump and the motor.

The hydraulic motor, which may be of the variable-capacity type (i.e. having a power output or torque proportion to the rate of fluid flow therethrough per unit rotation of the motor and/or an adjustable stroke for determining the rate of fluid flow) is, according to a further feature of the invention, coupled with the control means by a suitable mechanism for varying the effective torque of the motor in accordance with the magnitude of the load. Again, the control means may be actuatable for the simultaneous operation of the fuel-feed means and the mechanism to increase the supply of fuel to the turbine concurrently with an increase in the stroke or capacity of the motor. Moreover, the output member of the motor can be provided with speed-responsive means connected with the control means for increasing the stroke of the motor upon a decrease in the velocity of the output member thereof indicative of an increasing load. Advantageously, the speed-responsive means is so connected to the control means that it simultaneously effects an increase in the flow of fuel in the turbine.

The above and other objects, features and advantages of the present invention will become more readily apparent from the following detailed description, reference being made to the accompanying drawing in which.

Figure 3:
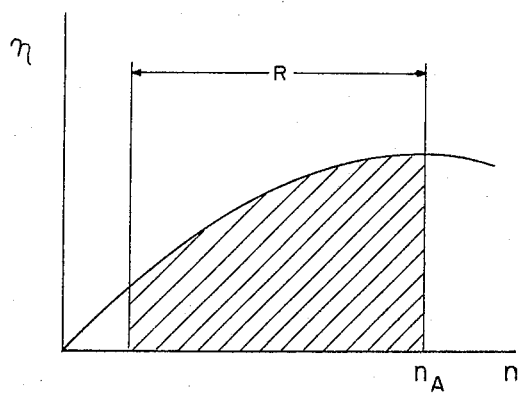
FIG. 3 is a graph of the efficiency characteristic of a conventional turbine-compressor assembly.

Referring first to the graph of FIG. 3, it may be seen that the efficiency $n$ of a prime-mover system wherein the turbine and the compressor have a common shaft increases substantially linearly with the value of the shaft speed $(n)$ in revolutions per minute and then reaches a maximum in the shaded region R of the curve which then has a hyperboloidal configuration. The region R of the graph is that in which operation of the system normally takes place, there being a speed $n_A$ at which the efficiency reaches an optimum value. Since application of a load to the output member causes a decrease in its speed under most circumstances, there is a reduction in operating efficiency along the portion of the graph on the left-hand side of $n_A$ corresponding to the actual speed of the turbine shaft.

Figure 1:
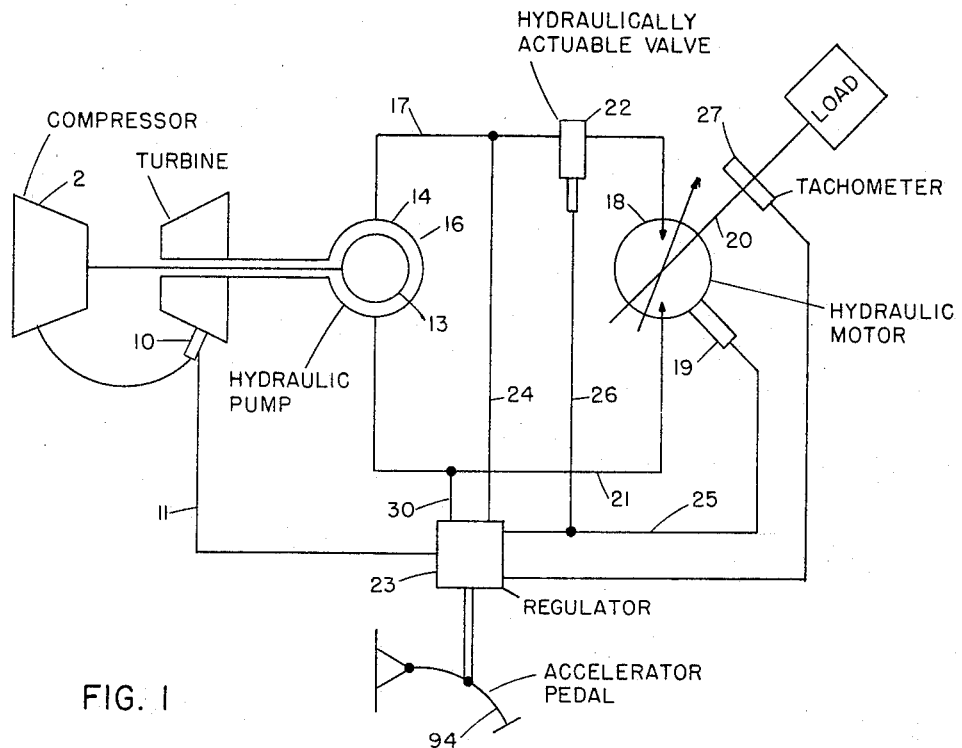
FIG. 1 is a flow diagram of the basic parts of a prime-mover system embodying the present invention.

According to the present invention, the disadvantage of these earlier systems can be avoided with a system of the type shown diagrammatically in FIG. 1. In this figure, I show a turbine 1 whose output shaft 15 is connected with the outer member 14 of a hydraulic pump 16 of the constant-stroke, positive-displacement type, the fluid flow from this pump being proportional to the relative displacement of the inner and outer pumping members 13 and 14, respectively. This pump provides a fluid connection between the turbine 1 and a compressor or densifier 2 whose driven member 12 is secured to the inner pump member 13 and passes coaxially through the output shaft 15. An intake 7 supplies air to the compressor 2 which compresses this combustion-sustaining fluid and feeds it to a combustion chamber 10 via a conduit 9, fuel being admitted at 11 to the combustion chamber 10 to provide, upon combustion, an expansion of gases, the latter being fed to the turbine 1 for driving it; an exhaust tube 8 is provided to conduit waste gases away from the turbine. The outlet side of pump 16 is connected with a hydraulic motor 18 of adjustable stroke via a conduit 17. The stroke or torque output of motor 18 can be varied by a servomotor 19 of the fluid-operated type; the motor has an output shaft 20 connected with the load and co-operating with speed-responsive means 27 (e.g. a tachometer). A further conduit 21 connects the outlet side of motor 18 with the inlet side of pump 16. A valve 22, responsive to a control pressure, is provided in conduit 17.

A control device 23 is operably by the accelerator or fuel-control pedal 24 of the system or an automotive vehicle incorporating it. The control means or regulator 23 is provided with a control line 25 by means of which the servomotor 19 can be actuated and is connected with the pressure and suction lines 17 and 21 via conduits 29 and 30, respectively, whereby the pressure within lines 17 and 21 can influence the regulator 23. The latter is also influenced by fluid pressure in a conduit 28 coupled with the tachometer 27 and controls the valve 22 via conduit 26.

The system shown in FIG. 1, which is particularly suitable for an automotive vehicle, has a "neutral" or idling condition in which the gas pedal 24 is unactuated. In this condition of the system, valve 22 remains closed so that rotation of the turbine 1 entrains compressor 2 via the hydrostatic fluid coupling constituted by pump 16, at a speed substantially identical to that of the output member of the turbine. Under these circumstances the oil pressure in pump 16 is determined by the inertia and friction of the shafts.

When it is desired to place the vehicle in motion, actuation of pedal 24 operates the regulator 23 to supply fluid under pressure to valve 22 and establish communication via conduits 17 and 21 between the pump 16 and the motor 18, the latter being operated to drive shaft 20 and the load connected therewith. Concurrently with the actuation of valve 22, the regulator increases the supply of fuel to the combustion chamber 10 to increase the turbine speed relatively to the compressor speed. The flow of fluid from pump 16 is thus proportional to the relative movement of the co-operating pump members 13 and 14 and, consequently, the difference in speed between the turbine and the compressor, this difference in speed determining the rate of operation of the output member of shaft 20 of motor 18. During the operation at normal speeds, the load on shaft 20 restricts the rate of flow of fluid through motor 18 and, consequently, the amount of fluid available in line 21 to supply the pump. The turbine 1 thus forcibly entrains the compressor 2 as a consequence of the restricted availability of fluid so that the co-operating pump members 13 and 14 have a low relative speed.

With increasing speed of the vehicle, motor 18 requires greater volumes of hydraulic fluid and the turbine 1 has a still greater speed in comparison with that of the compressor 2. Depression of pedal 24 thus results in an actuation of regulator 23 to increase the turbine speed and modify, if necessary, the capacity of motor 18 via the servomotor 19. When a hydraulic motor having no capability for stroke adjustment is provided, an increase in torque can only be effected by a change in the hydraulic pressure in line 17, i.e. only via an additional change in the angular velocity of the compressor shaft.

When the vehicle reaches its maximum velocity, the pressure in line 25 has its maximum value. The servomotor 19 maintains hydraulic motor 18 in its low-stroke position (i.e. low torque) while the supply of fuel to the turbine has its maximum value. In this operative condition of the system, the tachometer 27 is designed to be ineffective.

When high torques are required, i.e. for climbing hills under load, the gas pedal 24 is fully depressed while the shaft 20 rotates at reduced speed to place the tachometer 27 in operation and effect a reduction of the pressure in line 25. Consequently, servomotor 19 is operated to increase the stroke of the motor 18 and, therefore, the torque supplied to the load.

During downhill operation of the vehicle, shaft 20 has its maximum angular velocity so that tachometer 27 is again cut out; the gas pedal 24 is in its neutral or idling position and the hydraulic motor 18 functions as a pump to increase the pressure within line 21. This increased pressure, communicated to the regulator 23 by line 30, maintains the pressure within line 25 at substantially the same level as that prevalent during straight or normal operation of the vehicle. Servomotor 19 then insures that the hydraulic motor 18 is in its low-capacity or low-stroke stage. Since the pump 16 now functions as a hydraulic motor, there is an acceleration of the turbine and a reduction in the angular velocity of the compressor. The turbine-and-compressor system can now function as a utility brake engine since little or no fuel is supplied to the turbine. Concurrently, the compressor supplies less air with reduced pressure to the turbine so that it further inhibits the movement of the vehicle.

In a system of this type it is possible to insure that in substantially all conditions of the operation of the vehicle, the compressor 2 operates at its most economical angular velocity while the angular velocity of the turbine can be up to about 3,000 r.p.m. higher. For example, the turbine speed can vary between 50,000 and 53,000 r.p.m. while the compressor speed is held constant at 50,000 r.p.m. The difference in angular speeds, i.e. the relative speed between turbine and compressor and between pump members, can range between 0 and 3,000 r.p.m., a relative velocity well within the usual operating limits of a hydraulic system. No step-down gearing is thus required. The vehicle can also be opearted with a hydraulic motor of invariable stroke if desired, the accelerator pedal, in this case, being actuatable to provide the desired control; the use of servomotor 19 insures that an automatic variation of the torque will be possible.

Figure 2:
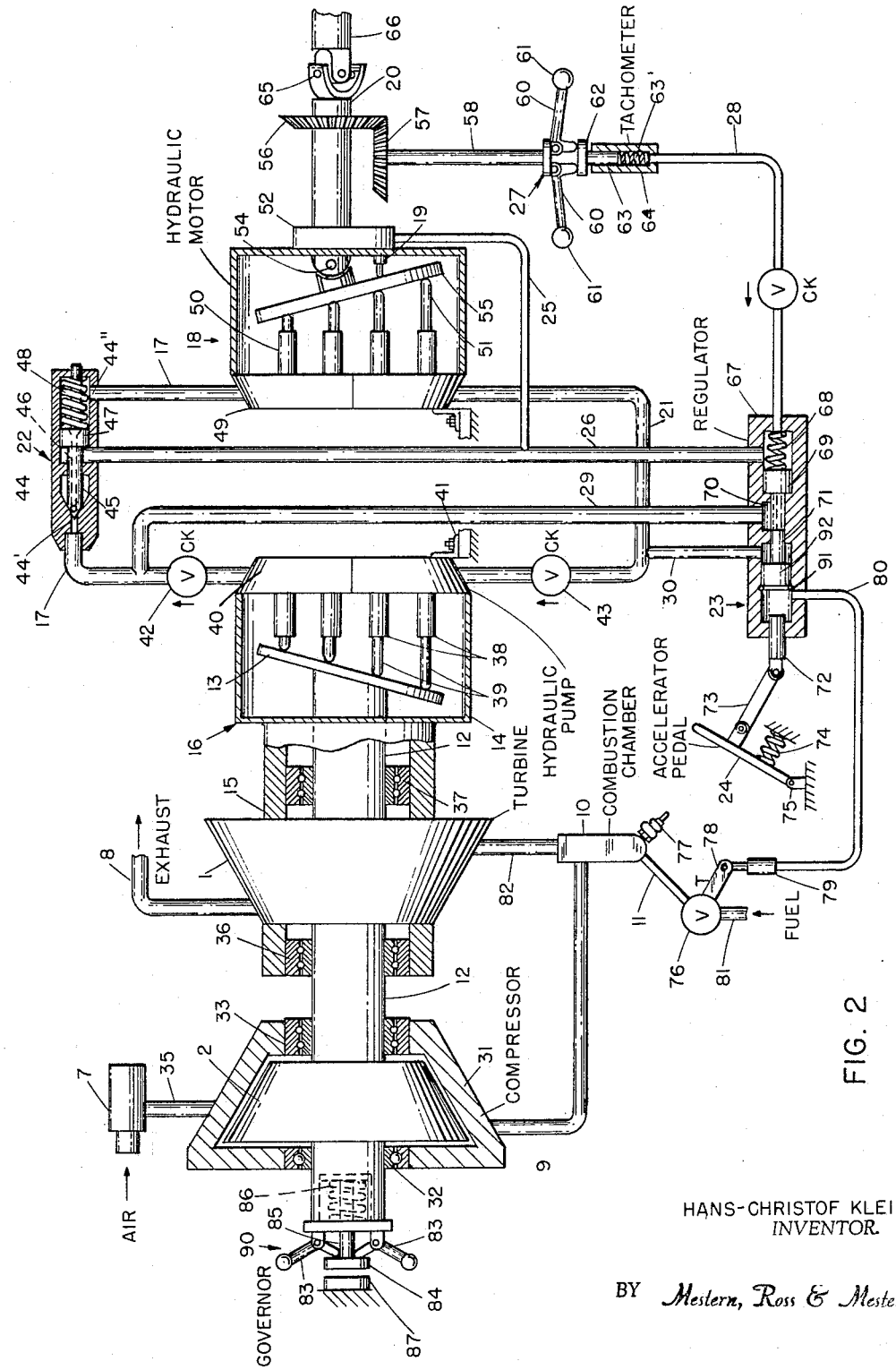
FIG. 2 is a diagram similar to FIG. 1 but showing suitable control and hydraulic systems therefor in greater detail.

In FIG. 2 I show a system wherein a swash-plate pump and a swash-plate motor of the general type illustrated in U.S. Patent No. 2,599,814 are employed. As shown in this figure, the compressor 2 has its air intake 7 constituted as a filter and connected to the compressor housing 31 by a conduit 35, the compressor shaft 12 being journaled in bearings 32 and 33 of the fixed housing 31. To insure operation of the compressor at its most economic and efficient speed, shaft 12 can be provided with a governor 90 to maintain its speed at about the 50,000 r.p.m. mentioned above. The governor 90 comprises a pair of weighted levers 83 pivoted to a transverse face of shaft 12 and adapted to bear upon a brake plate 84 whose stud 85 is slidably guided axially in shaft 12 and is engaged by a spring 86, designed to counter the effect of levers 83. Plate 84 cooperates with a fixed plate 87 to brake the motion of shaft 12. When the angular velocity of shaft 12 increases above the optimum value for the compressor 2, weighted levers 83 swing outwardly to urge plate 84 against plate 87 and prevent a further increase in the speed of shaft 12. The turbine 1 is fixed to the tubular shaft 15 which is journaled for rotation relative to shaft 12 and surrounds the latter, bearings 36 and 37 supporting shaft 15 upon shaft 12.

The pump 16 can be of the fixed-stroke swash-plate type illustrated and is well known per se so that it need not be described in detail herein. For purposes of clarification, however, it may be noted that the housing 14 of this pump is movable, relatively to its support 41 and a hydraulic distributor 40, together with the tubular shaft 15 to which it is secured, while the swash plate is constituted as the pump member 13 secured to shaft 12. A plurality of cylinders 38 mounted upon the housing 14 for rotation therewith have their pistons 39 yieldably bearing against the swash plate 13. The lower portion of distributor 40 constitutes the inlet section the pump into which conduit 21 feeds via a check valve 43. The upper portion of distributor 40 forms the outlet portion to which conduit 17 is connected via check valve 42. Valve 22 in conduit 17 is shown diagrammatically to comprise a valve body 44 having an inlet bore 44' and an outlet bore 44". The inlet bore 44' terminates in a conical seat against which a valve member 45 bears under action of a compression spring 48. The valve member 45 is provided with a bore 46 opening at the conical face of the member and terminating in communication with outlet 44" so that displacement of the valve member 45 to the right will effect communication between the inlet and outlet passages of the valve. To shift the valve member 45, the latter is provided with a piston head 47 to which fluid is supplied via tube 26. When the pressure in this tube increases, the valve member 45 is shifted to the right and held in its open position by the force of fluid passing from conduit 17 to the hydraulic motor 18.

The motor 18, which is also shown to be of the swash-plate type, is provided with the hydraulically operated servomotor 19 which is connected to the swash plate 55 in such manner as to swing the latter about pivot 54 upon an increase in pressure in line 25 to reduce the stroke of the pistons 51 of the swash-plate cylinders 50. The servomotor and the pump are only shown diagrammatically to represent any adjustable-stroke hydraulic motor of conventional type, it being understood that the mechanisms shown in the aforementioned U.S. patent and other conventional systems for varying the stroke are equally suitable within the realm of the present invention. Since output shaft 20 rotates relatively to the housing 49, a rotary seal 52 is diagramatically illustrated for supplying fluid from conduit 25 to the rotating servomotor 19. Shaft 20 may be the conventional drive shaft of an automotive vehicle and is shown to have a universal coupling 65 connected to the differential shaft 66 of the vehicle.

The tachometer 27 comprises a bevel gear 56 mounted upon the output shaft 20 and meshing with a further bevel gear 57, which drives a step shaft 58 whose terminal plate 59 carries a pair of levers 60 weighted at their outermost extremities 61. Levers 60 have camming surfaces adapted to bear against surface 62 of a piston 63 which is displaceable within a hydraulic cylinder 64 to increase or decrease the pressure supply to the regulator 23 via line 28. The levers 60 are shown in their maximally extended positions corresponding to rotation of the shaft 20 at high velocity. In this position of the levers 60, there is no further displacement of piston 63 so that the tachometer 67 does not affect the regulator 23. When, however, the angular velocity of shaft 20 falls, the weighted levers 60 shift downwardly to permit piston 63 to rise under the action of spring 63' and decrease the pressure at the outlet side of regulator 23; consequently, the pressure supplied to line 25 and servomotor 19 is decreased.

The regulator 23 may comprise a housing 67 within which a floating piston 69 is displaceable against the force of spring 12 to drive fluid into conduits 25 and 26 to operate valve 22 and the servomotor 19. As illustrated, the accelerator pedal 24, which is pivoted to the vehicle body at 75 and is displaceable against the force of spring 74, is coupled with a piston 72 via a link 73 to compress fluid within compartment 91 of housing 67 and thus increase the pressure in a line 80 communicating between this compartment and a fluid-operated fuel-feed system. This system is shown to be provided with a cylinder 79 responsive to the pressure within line 80 and having a piston connected with the actuating member 78 of a throttle valve 76 through which fuel is fed from an inlet 81 through conduit 11 into the combustion chamber 10 provided with an ignition device 77. Combustion chamber 10 is connected to the turbine 1 via tube 82. Hydraulic cylinder 79 and throttle valve 76 are merely representative of any conventional fluid-operated feed means for supplying fuel to the turbine. Compartment 91 also faces the enlarged head 92 of a piston 71 against which the fluid pressure of conduit 30 acts. When the pressure in this conduit increases as a consequence of the braking action of the system, piston 71 is shifted to the left to reduce the pressure within compartment 70 and thus the pressure acting upon floating piston 69; stops prevent excessive displacement of piston 71 to such an extent that an increase of fuel feed results. Consequently, the pressure in line 25 is reduced. Compartment 70 communicates with conduit 29 to insure that, once the valve 22 is opened via a shift of the floating piston 29 to the right (i.e. by displacement of pistons 72 and 71 to the right), the pressure in line 17 and 29 will maintain the valve 22 in its open position and thus supplement the force of the fluid applied to valve member 45.

It is to be understood that the present invention is not limited to the embodiment illustrated but admits of modifications apparent to persons skilled in the art without departing from the spirit and scope of the invention as defined in the appended claims.

What is claimed is:

1. A method of operating a turbine prime mover wherein a gas turbine is connected to a compressor feeding said turbine, comprising the steps of:
    driving relatively displaceable cooperating pumping members of a hydraulic pump with said turbine and said compressor, respectively, to displace hydraulic fluid at a rate proportional to the difference in speeds of said compressor and said turbine; and
    driving a hydraulic motor connected to a load with the hydraulic fluid displaced by said pump.

2. A method of operating a turbine prime mover wherein a gas turbine is connected to a compressor feeding said turbine, comprising the steps of:
    driving relatively displaceable cooperating pumping members of a hydraulic pump with said turbine and said compressor, respectively, to displace hydraulic fluid at a rate proportional to the difference in speeds of said compressor and said turbine;
    driving a variable-capacity hydraulic motor connected to a load with the hydraulic fluid displaced by said pump; and
    varying the capacity of said motor in accordance with the magnitude of said load.

3. A method of operating a turbine prime mover wherein a gas turbine is connected to a compressor feeding said turbine, comprising the steps of:
    driving relatively displaceable cooperating pumping members of a hydraulic pump with said turbine and said compressor, respectively, to displace hydraulic fluid at a rate proportional to the difference in speeds of said compressor and said turbine;
    driving a variable-capacity hydraulic motor connected to a load with the hydraulic fluid displaced by said pump;
    varying the capacity of said motor in accordance with the magnitude of said load; and
    terminating the flow of said fluid from said motor to said pump and operating said members at substantially identical speeds in a condition of said prime mover decoupled from said load.

4. A method of operating an automotive vehicle having a turbine prime mover wherein a gas turbine is connected to a compressor feeding said turbine and an accelerator for controlling the rate at which fuel is fed to said turbine, comprising the steps of:
    driving relatively displaceable cooperating pumping members of a hydraulic pump with said turbine and said compressor, respectively, to displace hydraulic fluid at a rate proportional to the difference in speeds of said compressor and said turbine;

driving a variable-capacity hydraulic motor connected to a load with the hydraulic fluid displaced by said pump; and varying the capacity of said motor in accordance with the magnitude of said load and upon the operation of said accelerator.

5. A method of operating an automotive vehicle having a turbine prime mover wherein a gas turbine is connected to a compressor feeding said turbine and an accelerator for controlling the rate at which fuel is fed to said turbine, comprising the steps of:

driving relatively displaceable cooperating pumping members of a hydraulic pump with said turbine and said compressor, respectively, to displace hydraulic fluid at a rate proportional to the difference in speeds of said compressor and said turbine;

driving a variable-capacity hydraulic motor connected to a load with the hydraulic fluid displaced by said pump;

varying the capacity of said motor in accordance with the magnitude of said load and upon the operation of said accelerator; and terminating the flow of said fluid from said motor to said pump and operating said members at substantially identical speeds in a condition of said prime mover decoupled from said load.

6. A prime-mover system, comprising:
a gas turbine having an output member;
a compressor having a driven member and coupled with said gas turbine for supplying a combustion-sustaining fluid thereto;
a hydraulic pump having a pair of relatively displaceable pumping members respectively connected with said output member and said driven member for forming a fluid coupling between said output member and said driven member;
a hydraulic motor connectable to a load; and
conduit means interconnecting said pump with said motor for operating same with fluid displaced by said pump upon relative displacement of said pumping member.

7. A prime-mover system, comprising:
a gas turbine having an output member;
a compressor having a driven member and coupled with said gas turbine for supplying a combustion-sustaining fluid thereto;
a hydraulic pump having a pair of relatively displaceable pumping members respectively connected with said output member and said driven member for forming a fluid coupling between said output member and said driven member;
a hydraulic motor connectable to a load;
conduit means interconnecting said pump with said motor for operating same with fluid displaced by said pump upon relative displacement of said pumping member; and
control means including a valve in said conduit means between said pump and said motor for preventing flow of fluid from said pump to said motor in one operative condition of said control means wherein said pumping members are displaced in the identical direction at substantially equal speeds.

8. A prime-mover system, comprising:
a gas turbine having an output member;
a compressor having a driven member and coupled with said gas turbine for supplying a combustion-sustaining fluid thereto;
a hydraulic pump having a pair of relatively displaceable pumping members respectively connected with said output member and said driven member for forming a fluid coupling between said output member and said driven member;

a variable-capacity hydraulic motor connectable to a load;
conduit means interconnecting said pump with said motor for operating same with fluid displaced by said pump upon relative displacement of said pumping member; and
mechanism for varying the capacity of said motor in accordance with the magnitude of said load.

9. A prime-mover system, comprising:
a gas turbine having an output member;
a compressor having a driven member and coupled with said gas turbine for supplying a combustion-sustaining fluid thereto;
a hydraulic pump having a pair of relatively displaceable pumping members respectively connected with said output member and said driven member for forming a fluid coupling between said output member and said driven member;
a variable-capacity hydraulic motor connectable to a load;
conduit means interconnecting said pump with said motor for operating same with fluid displaced by said pump upon relative displacement of said pumping members;
control means including a valve in said conduit means between said pump and said motor for preventing flow of fluid from said pump to said motor in one operative condition of said control means wherein said pumping members are displaced in the identical direction at substantially equal speeds; and
mechanism operable by said control means for varying the capacity of said motor in accordance with the magnitude of said load.

10. A prime-mover system, comprising:
a gas turbine having an output member;
a compressor having a driven member and coupled with said gas turbine for supplying a combustion-sustaining fluid thereto;
a hydraulic pump having a pair of relatively displaceable pumping members respectively connected with said output member and said driven member for forming a fluid coupling between said output member and said driven member;
a hydraulic motor connectable to a load;
conduit means interconnecting said pump with said motor for operating same with fluid displaced by said pump upon relative displacement of said pumping members;
control means including a valve in said conduit means between said pump and said motor for preventing flow of fluid from said pump to said motor in one operative condition of said control means wherein said pumping members are displaced in the identical direction at substantially equal speeds; and
feed means operable by said control means for supplying fuel to said turbine.

11. A prime-mover system, comprising:
a gas turbine having an output member;
a compressor having a driven member and coupled with said gas turbine for supplying a combustion-sustaining fluid thereto;
a hydraulic pump having a pair of relatively displaceable pumping members respectively connected with said output member and said driven member for forming a fluid coupling between said output member and said driven members;
a variable-capacity hydraulic motor connectable to a load;
conduit means interconnecting said pump with said motor for operating same with fluid displaced by said pump upon relative displacement of said pumping members;
control means including a valve in said conduit means between said pump and said motor for preventing flow of fluid from said pump to said motor in one operative condition of said control means wherein said pumping members are displaced in the identical direction of substantially equal speeds;

mechanism operable by said control means for varying the capacity of said motor in accordance with the magnitude of said load;

and feed means operable by said control means concurrently with said mechanism for supplying fuel to said turbine.

12. A prime-mover system, comprising:

a gas turbine having an output member;

a compressor having a driven member and coupled with said gas turbine for supplying a combustion-sustaining fluid thereto;

a hydraulic pump having a pair of relatively displaceable pumping members respectively connected with said output member and said driven member for forming a fluid coupling between said output member and said driven member;

a hydraulic motor connectable to a load;

conduit means interconnecting said pump with said motor for operating same with fluid displaced by said pump upon relative displacement of said pumping members;

control means including a valve in said conduit means between said pump and said motor for preventing flow of fluid from said pump to said motor in one operative condition of said control means wherein said pumping members are displaced in the identical direction at substantially equal speeds;

feed means operable by said control means for supplying fuel to said turbine; and an operator-controllable accelerator connected with said control means for selectively actuating said feed means.

13. A prime-mover system, comprising:

a gas turbine having an output member;

a compressor having driven member and coupled with said gas turbine for supplying a combustion-sustaining fluid thereto;

a hydraulic pump having a pair of relatively displaceable pumping members respectively connected with said output member and said driven member for forming a fluid coupling between said output member and said driven member;

a variable-capacity hydraulic motor connectable to a load;

conduit means interconnecting said pump with said motor for operating same with fluid displaced by said pump upon relative displacement of said pumping members;

control means including a valve in said conduit means between said pump and said motor for preventing flow of fluid from said pump to said motor in one operative condition of said control means wherein said pumping members are displaced in the identical direction at substantially equal speeds;

mechanism operable by said control means for varying the capacity of said motor in accordance with the magnitude of said load;

feed means operable by said control means concurrently with said mechanism for supplying fuel to said turbine; and an operator-controllable accelerator connected with said control means for selectively actuating said feed means and said mechanism.

14. A system as defined in claim 13 wherein said pump is a nonregulatable positive-displacement pump.

References Cited by the Examiner

UNITED STATES PATENTS

| | | | |
|---|---|---|---|
| 2,318,028 | 5/1943 | Thomas | 230—15 X |
| 2,542,539 | 2/1951 | Kuhrt et al. | 60—13 |
| 2,659,528 | 11/1953 | Price | 230—114 |
| 3,039,267 | 6/1962 | Voreaux et al. | 60—53 |
| 3,058,297 | 10/1962 | Tolley | 60—19 |

JULIUS E. WEST, *Primary Examiner.*